United States Patent
Bernath et al.

(10) Patent No.: US 9,804,052 B2
(45) Date of Patent: Oct. 31, 2017

(54) DEVICE AND METHOD FOR CHECKING THE LEAK TIGHTNESS OF CONTAINERS

(71) Applicant: Stratec Control-Systems GmbH, Königsbach-Stein (DE)

(72) Inventors: Christian Bernath, Bad Herrenalb (DE); Gerhard Dietz, Karlsbad (DE); Josef Kirchgessner, Birkenfeld (DE); Bruno Weik, Engelsbrand (DE)

(73) Assignee: Stratec Control-Systems GmbH, Königsbach-Stein (DE)

( * ) Notice: Subject to any disclaimer, the term of this patent is extended or adjusted under 35 U.S.C. 154(b) by 243 days.

(21) Appl. No.: 14/698,199

(22) Filed: Apr. 28, 2015

(65) Prior Publication Data

US 2015/0226632 A1    Aug. 13, 2015

Related U.S. Application Data

(63) Continuation of application No. PCT/EP2013/072733, filed on Oct. 30, 2013.

(30) Foreign Application Priority Data

Oct. 31, 2012  (DE) .................... 10 2012 219 993

(51) Int. Cl.
*G01M 3/36* (2006.01)
(52) U.S. Cl.
CPC .................... *G01M 3/36* (2013.01)
(58) Field of Classification Search
CPC .......... G01M 3/32; G01M 3/36; G01M 3/363; G01M 3/366
See application file for complete search history.

(56) References Cited

U.S. PATENT DOCUMENTS

| 3,751,972 A | * | 8/1973 | Hass | G01M 3/363 73/45.4 |
| 4,649,740 A | * | 3/1987 | Franklin | G01M 3/36 73/45.4 |

(Continued)

FOREIGN PATENT DOCUMENTS

| DE | 24 22 526 A1 | 11/1975 |
| DE | 196 48 778 A1 | 5/1998 |

(Continued)

OTHER PUBLICATIONS

English translation of International Preliminary Report on Patentability, PCT/EP2013/072733, dated Mar. 9, 2015.

*Primary Examiner* — Natalie Huls
(74) *Attorney, Agent, or Firm* — Bose McKinney & Evans LLP

(57) ABSTRACT

The invention relates to a device and a method for checking the leak tightness of deformable containers. The device comprises a probe that can be brought in contact with a container in a probing motion, a drive unit for the probe, and a measuring apparatus coupled to the drive unit and/or the probe for determining the container leak tightness by evaluating the probing motion. For said device, according to this disclosure, a sensor element adapted to detect motion of the sensor element is arranged on the probe, and that the measuring apparatus coupled to the sensor element is designed to record a time curve of the probing motion.

14 Claims, 3 Drawing Sheets

(56) References Cited

U.S. PATENT DOCUMENTS

| | | | | |
|---|---|---|---|---|
| 4,663,964 A * | 5/1987 | Croce | ............ | G01M 3/363 73/49.3 |
| 4,771,630 A * | 9/1988 | Croce | ............ | G01M 3/363 73/49.3 |
| 4,862,732 A * | 9/1989 | Raymond | ............ | G01M 3/36 73/45.4 |
| 5,230,239 A * | 7/1993 | Gentile | ............ | G01M 3/36 73/45.4 |
| 6,321,590 B1 * | 11/2001 | Matsumura | ............ | G01M 3/2853 73/40 |
| 6,840,087 B2 * | 1/2005 | Lehmann | ............ | G01M 3/363 73/45.4 |
| 7,584,650 B2 * | 9/2009 | Lehmann | ............ | G01M 3/36 73/45.4 |
| 8,578,760 B2 * | 11/2013 | Calhoun | ............ | G01M 3/32 73/49.3 |
| 2010/0060393 A1 * | 3/2010 | Joo | ............ | H01H 33/38 335/180 |
| 2011/0054354 A1 * | 3/2011 | Hunter | ............ | A01G 7/00 600/587 |
| 2013/0111972 A1 * | 5/2013 | Subhash | ............ | G01M 3/3263 73/12.01 |

FOREIGN PATENT DOCUMENTS

WO    WO 99/15871 A1    4/1999
WO    WO 2010/005136 A1    1/2010

\* cited by examiner

DEVICE AND METHOD FOR CHECKING THE LEAK TIGHTNESS OF CONTAINERS

RELATED APPLICATIONS

This application is a continuation of PCT/EP2013/072733, filed Oct. 30, 2013, which claims priority to DE 10 2012 219 993.4, filed Oct. 31, 2012, both of which are incorporated herein by reference in their entireties.

BACKGROUND

The invention relates to a device for checking the leak tightness or leakage testing of containers, in particular, polyethylene terephthalate (PET) bottles under internal pressure, comprising a probe that can be brought into contact with a deformable container in a probing movement, a drive unit for the probe and a measuring device coupled to the drive unit and/or the probe for determining the container leak tightness by evaluating the probing movement. The invention also relates to a corresponding checking method.

WO-A 99/15871 discloses a device of the type in question and a method that can be carried out with it, in which a probing member is pressed against a container wall by a predetermined advancement of a sensing unit, the probing member being supported on the sensing unit by way of a compression spring. The end position of the probing member in the advancing movement is then detected as a measure of the gas pressure. Problematic aspects here appear to be the complex mechanical construction and the required positioning accuracy as well as possible influencing of the measuring accuracy by tolerances in the diameters of the bottles.

SUMMARY

Against this background, this disclosure further improves the checking devices and methods that are known in the prior art and provides a system that can be easily produced and reliably operated, in particular, even with a high container throughput, and has a low space requirement.

This disclosure is based on the idea of deriving from the movement profile of the probe a measure of the leak tightness, at least in qualitative terms. It is accordingly proposed by this disclosure that on the probe there is arranged a sensor element adapted for the detection of a movement of the probe itself, and that the measuring device coupled to the sensor element is designed for detecting the course of the probing movement over time. The time-resolved detection of a movement parameter, for which a displacement, speed or acceleration profile can be used, provides a high level of informational content for the evaluation. It is thereby ensured that it is only in the state of contact that a property of the object being measured influences the movement profile. The possibility of a specific evaluation of only one time segment also means that a high level of insensitivity to positioning tolerances can be achieved. Furthermore, it is also possible to dispense with an infeeding movement involving complex mechanics.

A preferred refinement of this disclosure provides that the sensor element has a piece of permanent magnet, and that the piece of permanent magnet, which is solidly integrated in the probe, possibly together with a ferromagnetic core, is inductively coupled to a measuring coil of the measuring device. In this way, a movement of the probe itself in relation to the measuring coil can be detected contactlessly, while involving little structural complexity and without appreciably influencing the course of movement.

The measuring device advantageously has a signal processor for the time-dependent detection of the movement profile, in particular the displacement covered and/or the speed and/or the acceleration of the probe during the probing movement.

In order to derive a qualitative or quantitative test result, an evaluation unit for determining a measure of the container leak tightness from the course of the probing movement over time is advantageously provided.

A further particularly advantageous refinement provides that, after an initial acceleration phase, the drive unit is switched off or decoupled from the probe, at least during the contact of the probe with the container, so that the impact behavior can be investigated without being affected by positioning problems.

To obtain a significant reduction in mechanical components, it is also of advantage if the drive unit has at least one drive coil for an electromagnetic drive of the probe. A further improvement provides that the drive unit has a first drive coil for an advancement of the probe, directed toward the container, and a second drive coil for a retraction of the probe into its starting position. To realize an electromagnetic actuator, it is advantageous if the probe has a ferromagnetic core that enters a drive coil.

The probe is advantageously formed by a linearly guided probe pin, which can be moved with its free end against the container, the actuating and sensing being able to take place by way of the pin shaft. It is also of advantage in this connection if the probe has a non-magnetic guide tube mounted in a sliding guide.

Alternatively, it may also be of advantage if the probe is arranged pivotably by way of a pivoting arm in a pivot bearing in the manner of a rocker. The pivot bearing may consequently be arranged outside a region that is susceptible to contamination, while the actual probing member is pivoted against the container at the end of the pivoting arm remote from the bearing. Such a pivot bearing also allows a low-friction movement sequence to be achieved.

In order to ensure a defined and rapid measuring sequence, it is advantageous if the range of movement of the probe is limited by at least one end stop.

With regard to a method, the improvement mentioned above is achieved by a course of the probing movement over time being detected by a sensor element arranged on the probe and a measuring device coupled to the sensor element, and by a measure of the container leak tightness being determined by evaluating the course over time. It is also of particular advantage if the probe is directed against the container without any driving forces.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
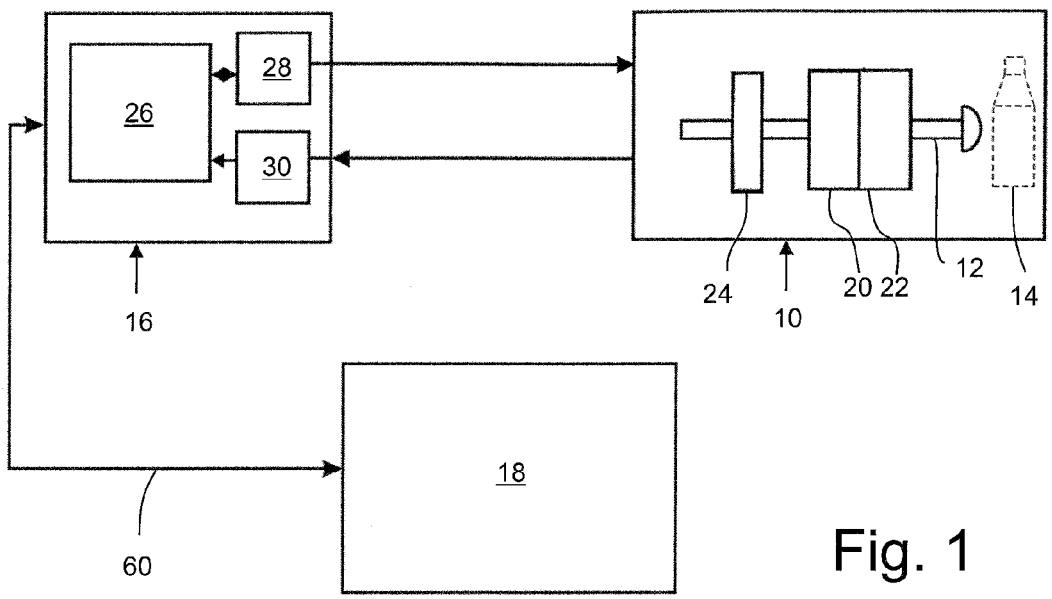
FIG. 1 shows a block diagram of a leak tightness checking system for elastic containers with an electromechanical sensing device.

The leak tightness checking system that is shown in the drawings can be used at a testing station at a filling plant, for example for PET beverage bottles, in order to detect leaking bottles as defective and segregate them. For this purpose, the system that is symbolically illustrated in FIG. 1 comprises a sensing device 10 with a linearly movable probe pin 12 for sensing a container 14 in a probing movement, a measuring device 16 for the real-time processing of the movement signals detected at the probe pin 12 and a computer-aided operator unit 18 for setting the operating parameters and calculating or displaying test results.

The sensing device 10 explained in more detail below has in the example shown in FIG. 2 two drive coils 20, 22 for an advancing and retracting movement of the probe pin 12 and a measuring coil 24 for detecting the probing movement. The pressure testing is based on the fact that the measurement of the impact behavior of the probe pin 12 fired against the container 14 in, as it were, a "freely flying" manner provides precise information about the internal pressure of the container 14, which influences the deformability.

The measuring device 16 comprises a signal processor 26 for processing measuring signals and for checking the measuring sequence. The activation of the drive coils 20, 22 takes place by way of an I/O unit 28, while the analog signals detected at the measuring coil 24 or a movement sensor are recorded with a given time increment by way of an A/D converter, so that the course of the probing movement over time is determined by a multiplicity of measured values.

Figure 2:
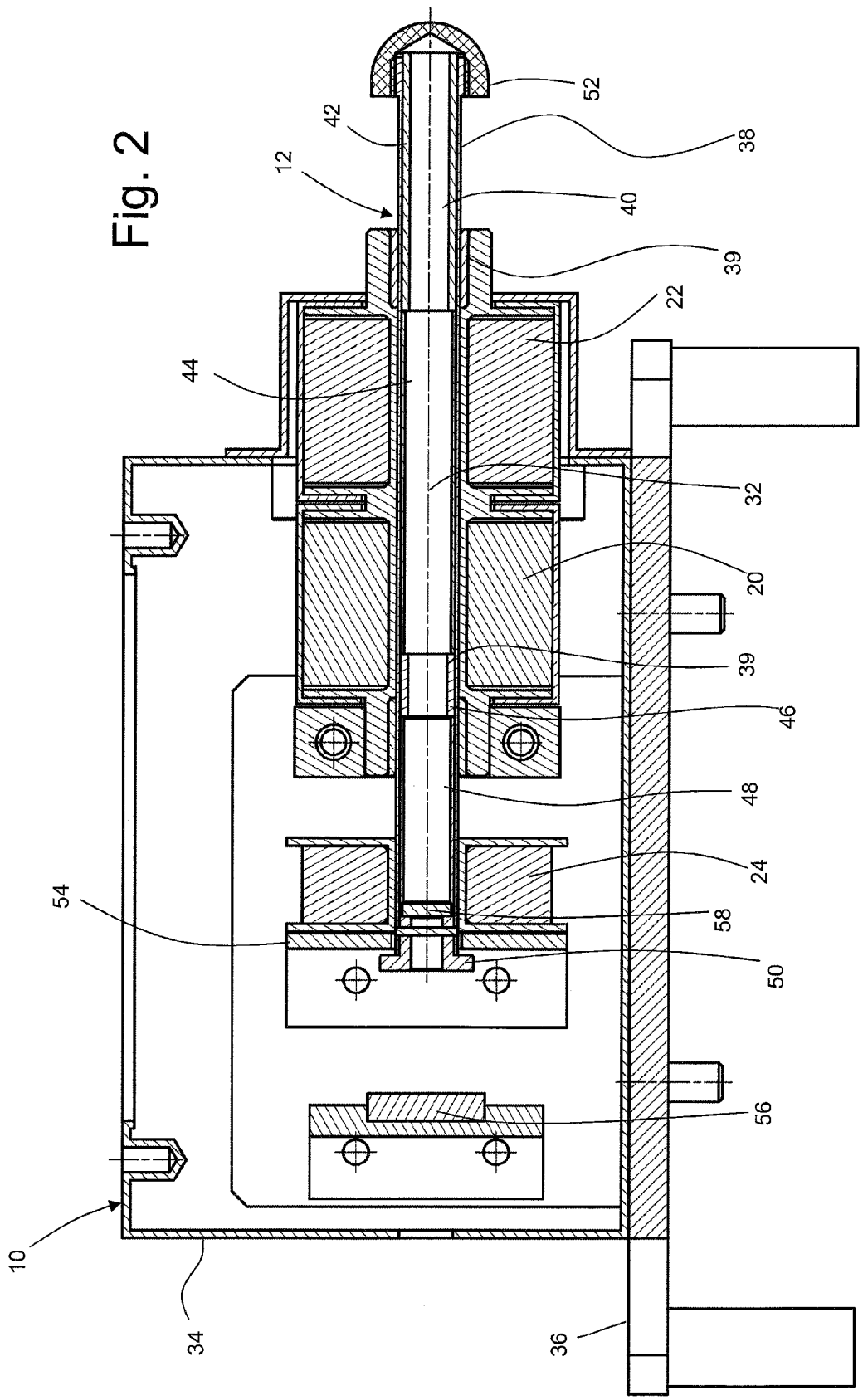
FIG. 2 shows the sensing device with an axially movable probe pin in vertical axial section.

FIG. 2 shows a vertical section of the sensing device 10 in the longitudinal axis 32 of the probe pin 12. A housing 34 on a frame 36 makes stable positioning possible in transverse alignment of the axis 32 in relation to the transporting direction of the containers 14 in the testing station. The drive coils 20, 22 and the measuring coil 24 are fixed to the housing coaxially in relation to the axis 32. A guide tube 38 passing centrally through the coils 20, 22, 24 forms the casing of the pin shaft 40. The guide tube 38, mounted in a linearly movable manner in sliding bearings 39, includes, as seen from the front to the rear, a non-magnetic first spacer sleeve 42, a first iron core 44, mounted in the drive coils 20, 22, and a non-magnetic second spacer sleeve 46, a second iron core 48, mounted in the measuring coil 24, and a proximal stroke limiter 50. Screwed onto the front end of the first spacer sleeve 42 is a metallic probe head 52, which with its convexly rounded front face makes it possible to press into a specific point on the container wall without damaging it. The stroke limiter 50, protruding radially at the rear end of the shaft as a collar, strikes against a stop 54 on the measuring coil 24 to limit the forward movement and against a damper 56 fixed to the housing to limit the retracting movement.

In order to be able to detect the movement of the probe pin 12 itself during its probing movement, a piece of permanent magnet 58 is solidly integrated as a sensor element at the rear end portion of the pin shaft 40, in magnetically conducting connection with the second iron core 48. During the probing movement, the arrangement comprising the piece of permanent magnet 58 and the iron core 48 moves in the fixed measuring coil 24 and thereby induces an electrical voltage that is proportional to the speed during the probing movement and can be picked up as analog measuring signal.

During the operation of the sensing device 10, the probe pin 12 is accelerated against the container 14 by energizing the drive coil 22, the iron core 32 being drawn into the center of the coil 22, where the magnetic flux density is greatest. Even before the contact of the probe head 52 with the container 14, the coil current is switched off, so that the probe pin 12 covers the remaining distance that is left at a uniform speed without any driving forces. During the subsequent impact, the flexible side wall of the container 14 is pressed inward by the probe pin 12 in dependence on the internal pressure, until the point of reversal is reached and the probing movement is reversed again on account of the elastic force of reaction of the container 14. The course of this movement process can be recorded by means of the signal processor 26 by using the induction signals of the piece of permanent magnet 58 that are picked up at the measuring coil 24, and possibly evaluated further by means of the operator unit 18 connected by way of a network 60, in order to segregate defective containers from the transporting section of the filling plant. For preparation in the starting position, the probe pin can be retracted by switching on the second drive coil 20, acting in the direction of retraction, until the stroke limiter 50 strikes against the damper 56. The entire process can be repeated with a high frequency, so that reliable testing operation is ensured even when the containers 14 are transported rapidly.

Figure 3A:
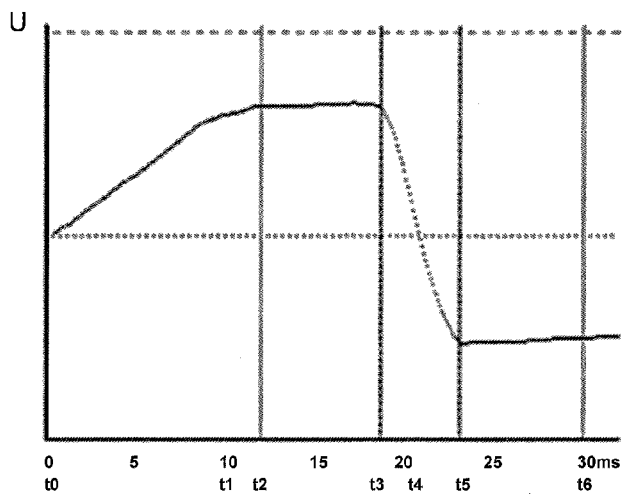
FIGS. 3a and b show the course of the speed of the probe pin when sensing containers with differing internal pressure.
Figure 3B:
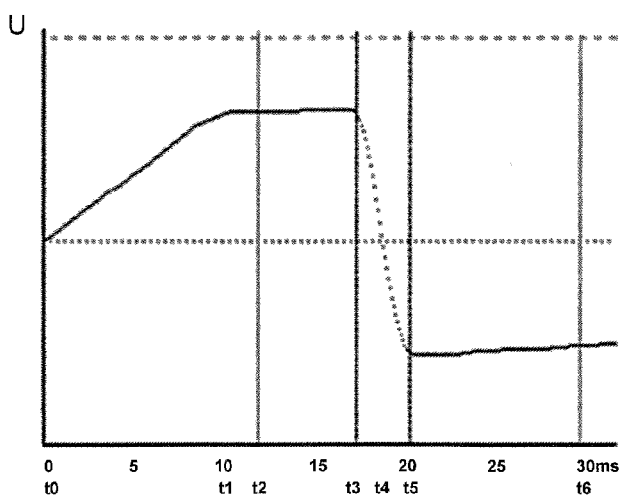

FIG. 3 shows speed diagrams of the probing movement for a container 14 with an internal container pressure of 0.5 bar (FIG. 3a) and 1.5 bar (FIG. 3b). Plotted as a measure of the speed of the probe pin 12 is the voltage U picked up at the measuring coil 24 in arbitrary units over the time t in milliseconds, the points in time t0 to t6 explained below being marked separately. At t0, the beginning of recording takes place with the activation of the first drive coil 22. At the point in time t1, at approximately 10 ms, the coil 22 is switched off again and the probe pin 12 moves further without being driven. Having reached that, at t2 an evaluation window is opened, and is closed again at the end of the measuring process at t6. Within this evaluation window, the impingement on the container 14 or the object being measured is reliably evident from the steep drop of the curve. At the zero crossing at t4, the reversal of movement takes place, here too the lifting off of the probe pin 12 from the container 14 being detectable without a problem from the discontinuous transition to the lower speed plateau. As a measure of the internal container pressure, the inverse value of the time interval t5-t3 can be determined. Alternatively, the pressure inside the container can be derived from the slope of the curve, i.e. the deceleration and acceleration of the probe pin 12 at the time interval t3 to t5. It is also conceivable to integrate the course of the speed, in order to gain from the displacement data thus obtained at least a qualitative measure of the internal pressure by way of the depth of penetration of the probe pin 12.

Figure 4:
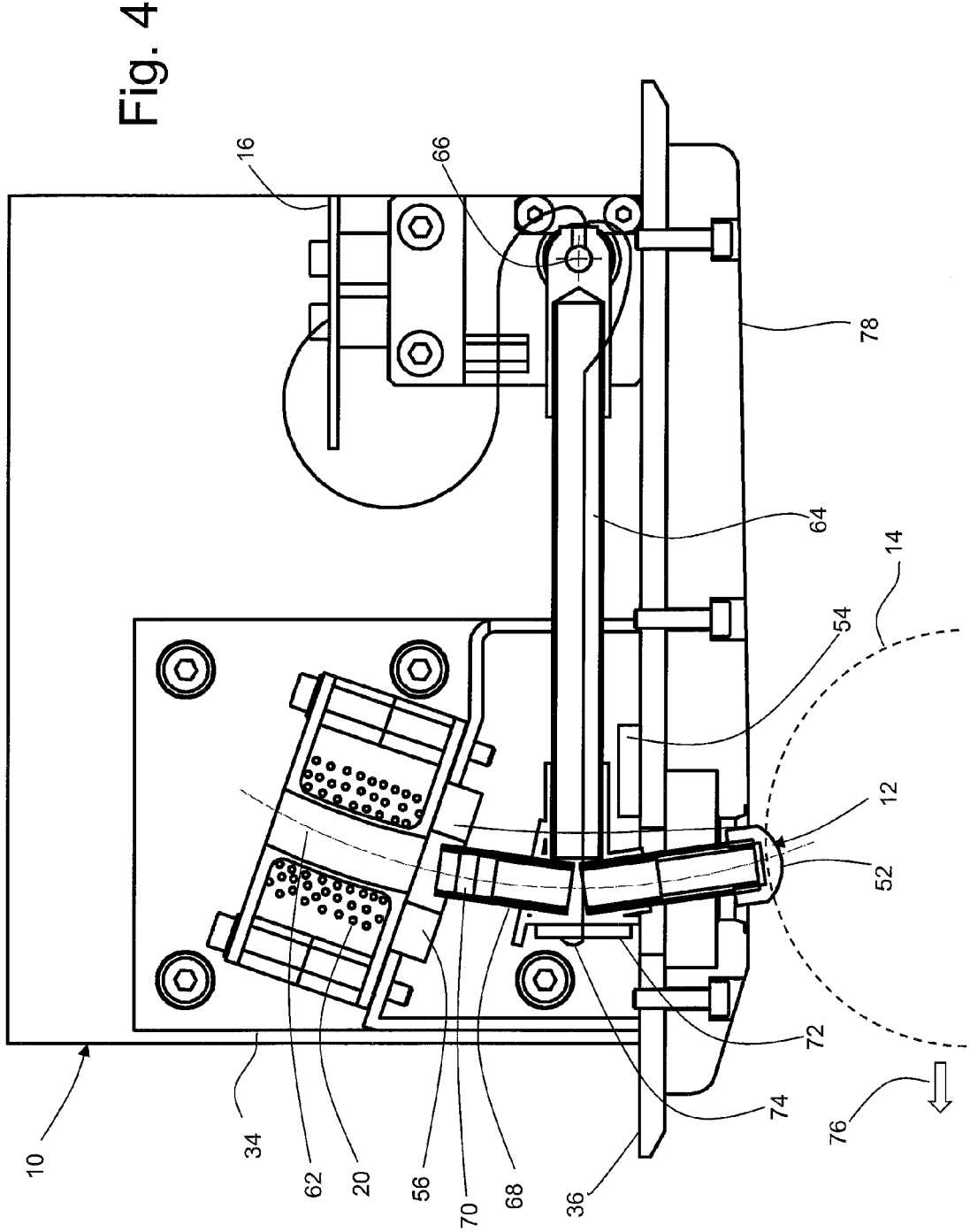
FIG. 4 shows a further embodiment with a pivotable probe pin in plan view.

In the case of the embodiment shown in FIG. 4, the same or similar parts are provided with the same designations as described above. One particular difference is that the probe pin 12 is not linearly movable, but pivotably movable in a horizontal plane along the circular path 62. For this, the probe pin 12 is held at one end of a pivoting arm 64, which is mounted at its other end in a pivot bearing 66. For a back and forth pin drive, a pole-reversible coil 20 that is fixed to the housing is provided in combination with a magnet carrier 68 fixed to the pin and permanent magnets 70 located in said carrier. Another difference is that, instead of inductive movement detection, an acceleration sensor 72 is used. The sensor 72 is formed by an integrated electronic module, which is fixedly attached to a carrier of the pin 12 and is supplied with operating voltage by way of a line 74. At the bearing-side end of the pivoting arm 64, the line 74 is led to the circuit board of the measuring device 16 by way of a flexible cable. In this way, measuring signals can be transmitted even during the movement. When there is a change in movement, the acceleration sensor 72 emits an analog voltage signal, which is recorded in dependence on time. By integration of the measured values, the speed or the pivoting displacement can also be determined time-dependently.

In FIG. 4, a detail of the peripheral contour of an undeformed container 14, for example a pressurized PET bottle, is indicated. The container 14 moves on a transporter in the direction of the arrow 76 and is thereby guided peripherally along the guide slope 78 into the arcuate path of movement 62 of the probe pin 12. The forward probing movement of the latter is thereby initiated by a suitably positioned light barrier (not shown). In this case, the container wall is deformed to an extent dependent on the internal pressure. In the case of a comparatively hard container 14, a high deceleration over a short time period is detected, while in the case of a softer container the deceleration is less and the probing process up to the time when the pin comes a standstill takes longer.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A device for checking the leak tightness of containers under internal pressure, comprising:
    a probe that can be brought into contact with a deformable container in a probing movement;
    a drive unit for the probe and a measuring device coupled to the drive unit and/or the probe for determining the container leak tightness by evaluating the probing movement;
    a sensor element arranged on the probe and adapted for the detection of a movement of the probe; and
    a processor configured to, during operation of the device, switch off or decouple the drive unit from the probe after an initial drive phase, whereby at least during the contact of the probe with the container, the probe is directed against the container without any driving forces, whereby the probe is freely flying before contacting the container;
    wherein the measuring device coupled to the sensor element is configured to detect a course of the probing movement over time.

2. The device as claimed in claim 1, wherein the sensor element has a piece of permanent magnet that is inductively coupled to a measuring coil of the measuring device.

3. The device as claimed in claim 1, wherein the sensor element is formed by an acceleration sensor fixedly connected to the probe.

4. The device as claimed in claim 1, wherein the measuring device has a signal processor for the time-dependent detection of the displacement covered and/or the speed and/or the acceleration of the probe during the probing movement.

5. The device as claimed in claim 1, further comprising an evaluation unit for determining a qualitative or quantitative measure of the container leak tightness from the course of the probing movement over time.

6. The device as claimed in claim 1, wherein the drive unit has at least one drive coil for an electromagnetic drive of the probe.

7. The device as claimed in claim 1, wherein the drive unit has a first drive coil for an advancement of the probe, directed toward the container, and a second drive coil for a retraction of the probe into its starting position.

8. The device as claimed in claim 1, wherein the probe has a ferromagnetic core that enters a drive coil.

9. The device as claimed in claim 1, wherein the probe is formed by a linearly guided probe pin, which can be moved with its free end against the container.

10. The device as claimed in claim 1, wherein the probe has a non-magnetic guide tube mounted in a sliding guide.

11. The device as claimed in claim 1, wherein the probe is arranged pivotably by a pivoting arm in a pivot bearing.

12. The device as claimed in claim 1, wherein the range of movement of the probe is limited by at least one end stop.

13. A method for checking the leak tightness of containers under internal pressure, comprising:
    using a drive unit to drive a probe in an initial drive phase;
    switching off or decoupling the drive unit after the initial drive phase;
    bringing the probe into contact with a deformable container in a probing movement, wherein the probe is directed against the container without any driving forces, whereby the probe is freely flying before contacting the container;
    detecting a course of the probing movement over time by using a sensor element arranged on the probe and a measuring device coupled to the sensor element; and
    determining a measure of the container leak tightness by evaluating the course over time.

14. The method as claimed in claim 13, wherein the probe is moved against the container in a linear or circular path.

* * * * *